(12) United States Patent
Clausen

(10) Patent No.: US 6,769,701 B1
(45) Date of Patent: Aug. 3, 2004

(54) SHOCK-ABSORBING WHEEL ASSEMBLIES FOR LUGGAGE BAG

(75) Inventor: Eivind Clausen, Bellingham, WA (US)

(73) Assignee: The Fairhaven Group, Inc., Bellingham, WA (US)

( * ) Notice: Subject to any disclaimer, the term of this patent is extended or adjusted under 35 U.S.C. 154(b) by 0 days.

(21) Appl. No.: 10/694,670

(22) Filed: Oct. 27, 2003

Related U.S. Application Data

(63) Continuation of application No. 10/271,872, filed on Oct. 15, 2002, now abandoned, which is a continuation of application No. 09/545,251, filed on Apr. 7, 2000, now abandoned.
(60) Provisional application No. 60/168,838, filed on Dec. 3, 1999.

(51) Int. Cl.[7] .............................................. B62D 21/11
(52) U.S. Cl. ................. 280/37; 280/DIG. 3; 190/18 A; 16/44
(58) Field of Search .................... 280/37, 43.1, DIG. 3; 190/18 A; 16/18 R, 34

(56) References Cited

U.S. PATENT DOCUMENTS

| | | |
|---|---|---|
| 501,706 A | 7/1893 | Curtis |
| 1,875,965 A | 9/1932 | Waters |
| 2,738,542 A | 3/1956 | Clark, Jr. |
| 4,168,082 A | 9/1979 | Hendrickson |
| 4,524,482 A | 6/1985 | Mueller |
| 4,685,174 A | 8/1987 | Hager |
| 5,103,530 A | 4/1992 | Andrisin, III et al. |
| 5,217,119 A | 6/1993 | Hollingsworth |
| 5,533,231 A | 7/1996 | Bai |
| 5,758,752 A | 6/1998 | King et al. |
| 5,778,488 A | 7/1998 | Tsai |
| 5,813,503 A | 9/1998 | Chang |
| 5,873,145 A | 2/1999 | Chou |
| 5,873,439 A | 2/1999 | Liang |
| 6,082,510 A | 7/2000 | Liang |
| 6,289,554 B1 | 9/2001 | Wang |
| 6,360,400 B1 | 3/2002 | Chang |
| 6,367,602 B1 | 4/2002 | Chang |
| 6,382,736 B1 | 5/2002 | Chang |
| 6,478,316 B1 | 11/2002 | Wagner |
| 6,484,359 B1 | 11/2002 | Guttmann et al. |

OTHER PUBLICATIONS

Huang, U.S. patent application Publication US 2003/0006572 A1, Jan. 9, 2003.

Primary Examiner—Brian L. Johnson
Assistant Examiner—Christopher Bottorff
(74) Attorney, Agent, or Firm—Michael R. Schacht; Schacht Law Office, Inc.

(57) ABSTRACT

Methods and wheel assemblies for supporting a bag that is tilted and pulled along a surface. A wheel housing, a strut member, a spring member, and a wheel member are provided. The wheel housing is rigidly attached to a bottom edge of the bag. The strut member is mounted within the housing for movement between first and second positions. The spring member is arranged between the wheel housing and the strut member to oppose movement of the strut member from the first position to the second position. The wheel member is rotatably attached to the strut member such that at least a portion of the wheel member extends out of the wheel housing as the strut member moves between the first and second positions. The wheel member engages the surface and rotates to allow the bag to roll along the surface when the bag is tilted and pulled. The strut member is substantially vertically aligned when the bag is tilted and pulled and when the strut member moves between the first and second positions. First and second wheel members can be attached to the bag for improved stability.

7 Claims, 6 Drawing Sheets

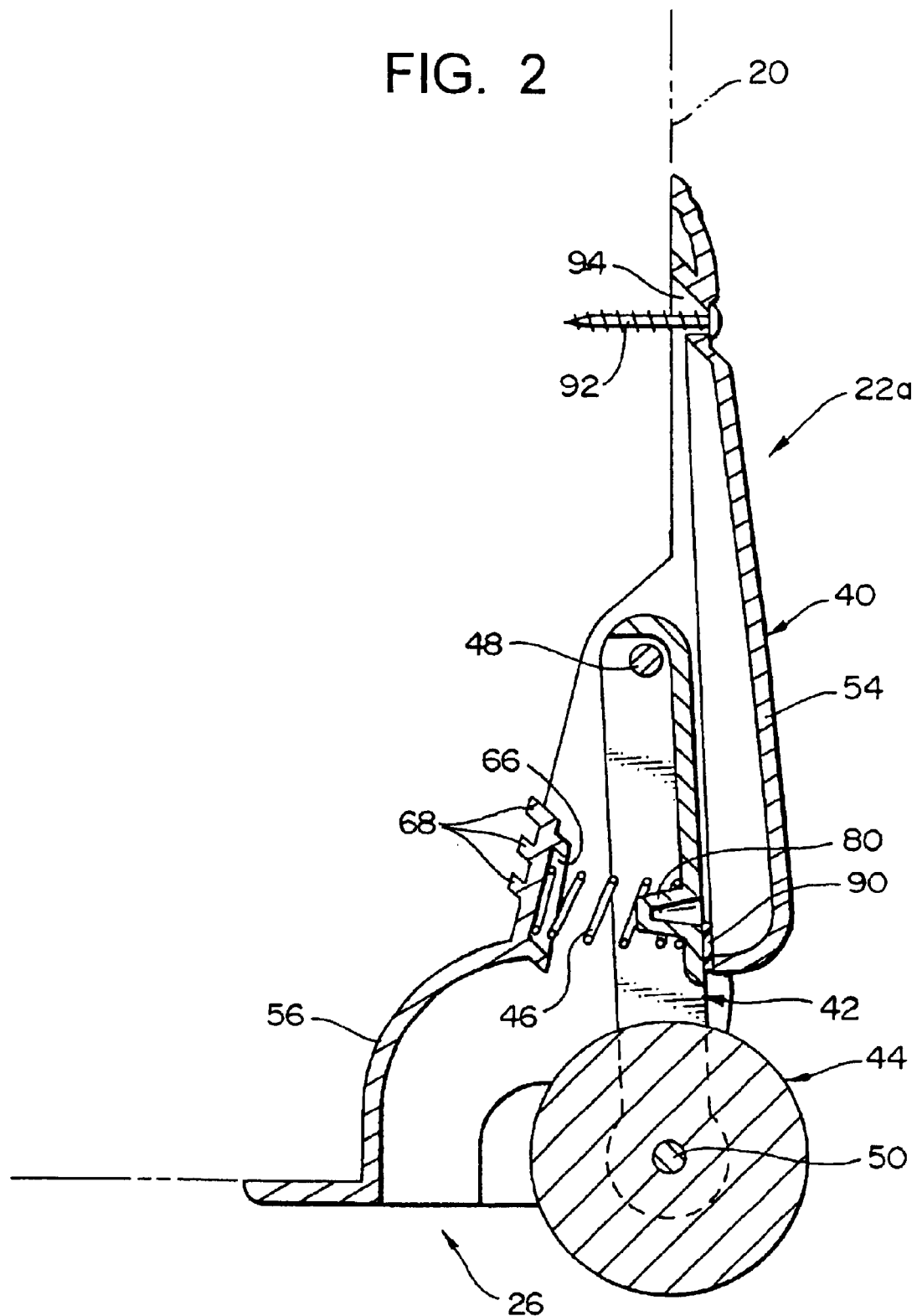

SHOCK-ABSORBING WHEEL ASSEMBLIES FOR LUGGAGE BAG

RELATED APPLICATIONS

This is a Continuation of U.S. Ser. No. 10/271,872 which was filed Oct. 15, 2002 abandoned, which is a Continuation of U.S. Ser. No. 09/545,251 which was filed Apr. 7, 2000, abandoned, which claimed priority of U.S. Provisional Patent Application Ser. No. 60/168,838, which was filed on Dec. 3, 1999.

TECHNICAL FIELD

The present invention relates to wheel assemblies for use on luggage and, more particularly, to shock absorbing wheel assemblies that inhibit transfer of external shocks to delicate equipment within the luggage.

BACKGROUND OF THE INVENTION

Electronic equipment, such as computers, printers, telephones, personal digital assistants, stereo equipment, test equipment, video cameras, and the like, is commonly made in portable form. Although portable electronic equipment is designed to be transported, care must be taken during transportation, and damage to such equipment may occur if external shocks are applied the equipment such as by dropping, jostling, or rough handling. Accordingly, portable electronic equipment is commonly transported in a padded bag to absorb such external shocks.

The present invention is of particular relevance when applied to the transportation of relatively large, heavy, and expensive electronic equipment such as portable computers, and that application will be described herein in detail. However, the present invention may have broader application to other delicate items of similar size and weight such as glassware, artwork, and the like. Accordingly, the scope of the present invention should be determined by the claims appended hereto and not the following detailed description.

A portable computer is commonly carried in a bag or case approximately the size of an oversized briefcase having padding material sewn into the exterior panels thereof. The padding material is commonly a resilient material such as foam that compresses when a force is applied but which expands to its original size and shape when the force is removed. For many external shocks, the padding material is sufficient to protect the computer within.

In addition, conventional computer bags or cases are often somewhat oversized, with an inner compartment for the computer and one or more outer compartments for paper material and less delicate or expensive equipment. The bulk of such multi-compartmented bags or cases also helps to protect a computer in the inner compartment because the collapsing of the external panels and the material in the outer compartments will absorb external shocks.

A class of computer bags even provides a separate internal cover that is padded and closely conforms to the outer dimensions of the computer. This internal cover is suspended within the outer, main bag or case by a resilient suspension system. The suspension system allows the internal bag or case to move within a narrow range of movement while resiliently opposing such movement. Such a suspension system is particularly effective at absorbing the shock of being dropped on a bottom edge panel.

In the last several years, wheeled luggage has become commonly available and popular in the marketplace. Wheeled luggage commonly comprises two wheel assemblies attached to a bottom edge panel of the bag and a retractable handle assembly that extends up from the top edge panel of the bag. The wheels are relatively unobtrusive, allowing the bag to be carried like a conventional suitcase with the handle assembly retracted when desired. When the bag is transported with the assistance of the wheels, the handle assembly is extended out and the bag is tipped slightly forward and pulled along with a forward face panel in front.

This type of wheeled luggage is popular because the user need not carry the entire weight of the luggage and its contents. The wheel assemblies employed by such wheeled luggage have been applied to computer bags or cases.

However, the Applicant has recognized that this type of wheel assembly has created a new class of potentially damaging shocks that may be transferred to the computer or other delicate electronic equipment within the bag or case. In particular, rolling the wheeled computer bag over a bumpy or uneven surface or up curbs may create vibrations and/or minor shocks that can damage delicate equipment. The need thus exists for improved wheeled bags that protect computers or other delicate equipment within when the bags are rolled along the ground.

RELATED ART

A professional patentability search conducted on behalf of the Applicant uncovered the following U.S. Pat. No. 5,873,439 to Liang; U.S. Pat. No. 5,873,154 to Chou; U.S. Pat. No. 5,758,752 to King et al.; U.S. Pat. No. 5,778,488 to Tsai; and U.S. Pat. No. 501,706 to Curtis.

U.S. Pat. No. 5,873,154 to Chou discloses a wheel assembly designed to be used with luggage that allows resiliently opposed movement of the wheel to absorb shocks and the like. This wheel assembly appears to be used in a set of four wheels that are all intended to engage at the ground at the same time. This would not be directly applicable to a bag in which the wheel assemblies are located on one edge of a bottom of a suitcase to bear the entire weight when the suitcase is tilted forward and rolled.

In addition, the Chou patent discloses the use of a wheel holder seat pivotably mounted onto a main seat. The wheel holder seat is in one embodiment substantially horizontal and in another embodiment (FIG. 8) to extends at an angle of about 30 to 40 degrees from horizontal. In both of these arrangements, it would be possible for dirt, rocks, and the like to lodge the area between the wheel holder seat and main seat to prevent movement of the wheel holder seat. This arrangement also requires a push rod which acts on the spring. This push rod resides in a channel which also creates the opportunity for friction and, under dirty conditions, unreliable movement of the push rod.

The Applicant believes that the remaining patents turned up in the search are less relevant than the Chou patent.

U.S. Pat. No. 5,778,488 to Tsai discloses a spring loaded retractable wheel. When a load is applied to the suitcase, the wheel moves into a retraction position in which the weight of the bag is born by the wheel. When the weight of the bag is removed from the wheel, a spring is configured to return the wheel to a retrieved position. This arrangement does not result in absorption of shocks by the spring, but instead simply moves the wheel into a retrieved position when the weight of the bag is not born by the wheel.

U.S. Pat. No. 5,873,439 to Liang discloses a supporting device for a wheeled suitcase. The suitcase is conventional in that it has a wheel along one edge of the case. A leg member may be rotated out to form a tripod that bears the weight of the suitcase. The leg member is detachably attached to the back of the suitcase when not in use.

U.S. Pat. No. 5,758,752 to King et al. discloses a retractable wheel for a bag. The wheel employs a spring to assist in moving it between two positions but does not absorb shocks in either of these positions.

U.S. Pat. No. 501,706 to Curtis patent discloses a hand truck or dolly having spring that attaches its lower ends to a wheel axial.

The Applicant is also aware of U.S. Pat. No. 5,217,119, which discloses a computer bag having an integral suspension systems. This patent does not disclose the use of wheel assemblies to facilitate transportation of the bag.

SUMMARY OF THE INVENTION

The present may be embodied as a wheel assembly for supporting a bag that is tilted and pulled along a surface. Such a wheel assembly comprises a wheel housing, a strut member, a spring member, and a wheel member. The wheel housing is rigidly attached to a bottom edge of the bag. The strut member is mounted within the housing for movement between first and second positions. The spring member is arranged between the wheel housing and the strut member to oppose movement of the strut member from the first position to the second position. The wheel member is rotatably attached to the strut member such that at least a portion of the wheel member extends out of the wheel housing as the strut member moves between the first and second positions. The wheel member engages the surface and rotates to allow the bag to roll along the surface when the bag is tilted and pulled. The strut member is substantially vertically aligned when the bag is tilted and pulled and when the strut member moves between the first and second positions.

The present invention may also be embodied as method of supporting a bag as the bag is tilted and pulled along a surface. In this case, the method comprises the steps of rigidly connecting a wheel housing to a bottom edge of the bag. A strut member is mounted within the housing for movement between first and second positions. Movement of the strut member from the first position to the second position is opposed by arranging a spring member between the wheel housing and the strut member. A wheel member is rotatably attached to the strut member such that at least a portion of the wheel member extends out of the wheel housing as the strut member moves between the first and second positions. The bag is tilted such that the wheel member engages the surface and the load of the bag is transmitted at least partly from the wheel housing to the strut member through the spring member. The housing member and the strut member are configured such that the strut member is substantially vertically aligned when the bag is tilted and when the strut member moves between the first and second positions.

The present invention may also be embodied as a bag assembly that is adapted to be tilted and pulled along a surface. In this case, the bag assembly comprises a bag, a handle assembly, and first and second wheel assemblies, The bag defines top and bottom edges. A handle assembly is mounted to the top edge of the bag. The first and second wheel assemblies are mounted to the bottom edge of the bag. Each of the wheel assemblies comprises a wheel housing, a strut member, a spring member, and a wheel member. The wheel members engages the surface and rotate to allow the bag to roll along the surface when the bag is tilted and pulled. The strut members are substantially vertically aligned when the bag is tilted and pulled and when the strut members move between the first and second positions.

BRIEF DESCRIPTION OF THE DRAWINGS

FIGS. 2 and 3 are side, cutaway views depicting a first embodiment of a wheel assembly that may be used by the computer bag or case of FIG. 1;

DETAILED DESCRIPTION OF THE INVENTION

The present invention relates to bags specifically designed to carry delicate equipment such as computers, and that application will be described below. The present invention may, however, have broader application to other types of baggage.

Figure 1:
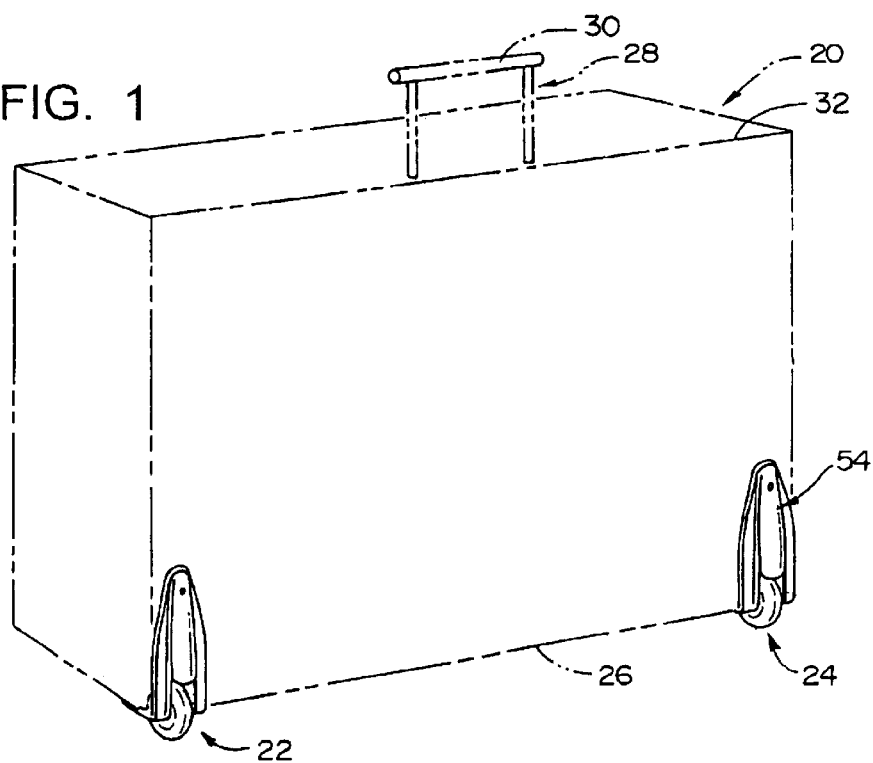
FIG. 1 is a perspective view of a computer bag or case employing wheel assemblies constructed in accordance with, and embodying, the principles of the present invention.

Referring initially to FIG. 1, depicted therein is a bag or case 20 incorporating first and second wheel assemblies 22 and 24 constructed in accordance with, and embodying, the principles of the present invention. The wheel assemblies 22 and 24 are mounted along a lower edge 26 of the bag or case 20. The bag or case 20 further comprises a handle assembly 28 having a handle member 30 that extends above an upper edge 32 of the bag 20. In use, the handle 30 will be grasped and the bag 20 tilted so that the weight of the bag is transferred to the ground surface by the wheel assemblies 22 and 24. The bag 20 may be rolled along the ground surface, with most of the weight of the bag 20 being carried by the first and second wheel assemblies 22 and 24.

The exemplary wheel assemblies 22 and 24 are preferably the same, and only the wheel assembly 22 will be described herein in detail. Two embodiments of wheel assemblies that can be used as the wheel assemblies 22 and 24 will be discussed below.

I. First Embodiment

Figure 3:
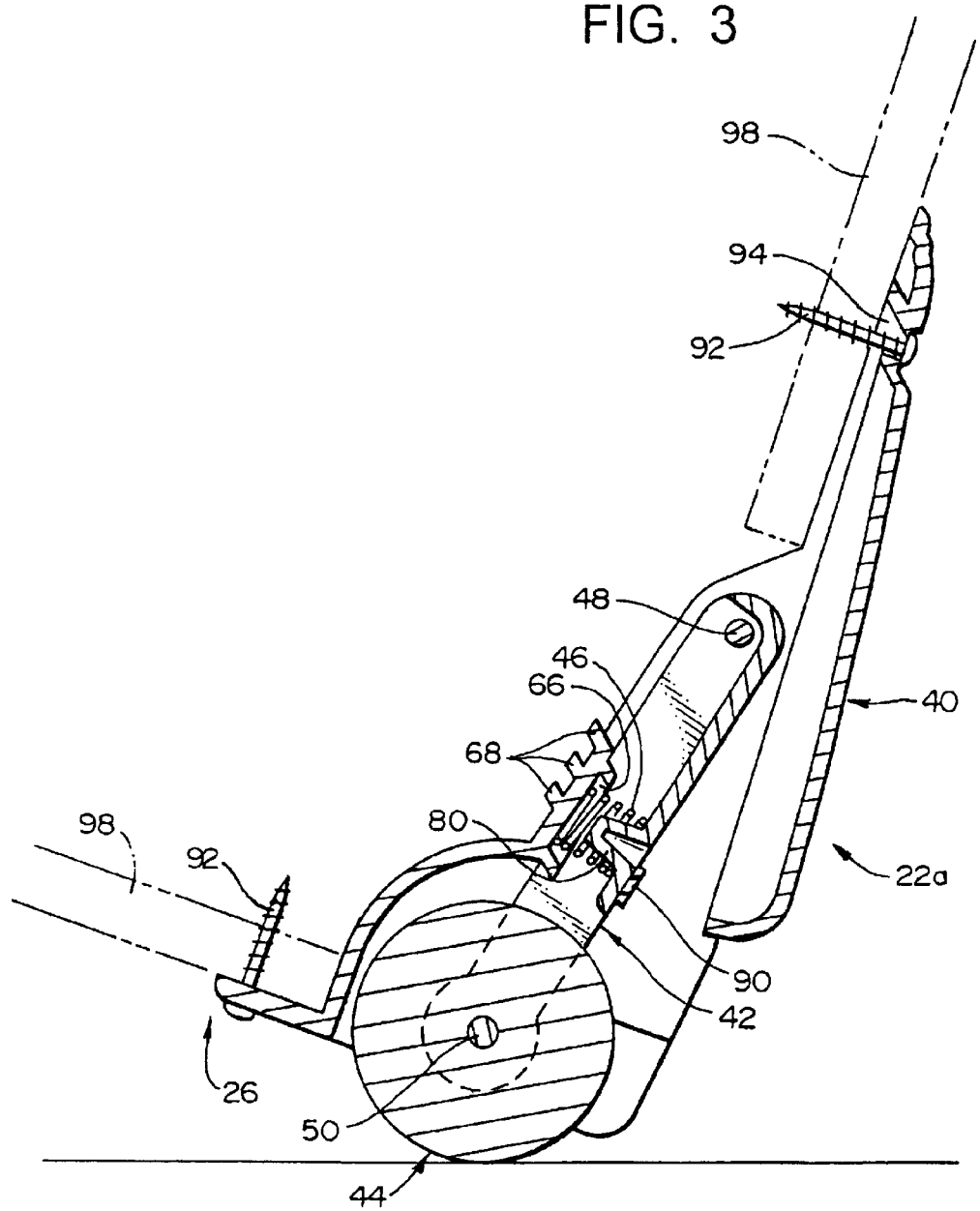

Referring now to the FIGS. 2 and 3, depicted at 22a therein is a first embodiment of a wheel assembly constructed in accordance with, and embodying, the principles of the present invention. The exemplary wheel assembly 22a comprise a wheel housing 40, a wheel strut 42, a wheel 44, and a spring 46.

The wheel strut 42 is pivotably attached by a pivot pin 48 to an upper end of the wheel housing 40 such that the strut 42 generally extends downwardly but can rotate through a short arc between forward (FIG. 2) and rearward (FIG. 3) positions.

A longitudinal axis A of the strut 42 is substantially vertically aligned as the strut 42 rotates between the forward and rearward positions. In the context of the present application, the term "substantially vertically aligned" refers to a body having a longitudinal axis that is close to, but not necessarily exactly, parallel with true vertical. The arc through which the wheel strut 42 rotates relative to the wheel housing 40 is preferably approximately 20°. This arc should preferably be within a first range of approximately 10° to 33°, but in any event should be within a second preferred range of approximately 5° to 45°. Maintaining the strut 42 substantially vertical as described herein reduces the likelihood that dirt, rocks, and debris will collect between the strut 42 and housing 40 and interfere with movement of the strut 42.

The wheel 44 is rotatably mounted to a lower end of the wheel strut 42 by a wheel axle 50 such that a portion of the wheel extends out of the wheel housing 40. The spring 46 is mounted between the wheel strut 42 and the wheel housing 40 such that the spring 46 opposes movement of the wheel strut 42 from its forward position to its rear position. The spring 46 also functions to return the wheel strut 42 to its forward position from the rear position.

In use, the bag 20 is tipped slightly towards the direction of travel (FIG. 3) such that the entire weight of the bag is borne by the wheel assemblies 22a and 24. The load of the bag 20 is transmitted to the ground surface through the wheel housing 40, spring 46, the wheel struts 42, and the wheel wheels 44. The bag load will slightly compress the spring 46 during normal use.

When the wheels 44 encounter an irregularity such as a bump, dip, or the like in the surface on which the bag 20 is traveling, this irregularity will create a shock force that will be transmitted through the wheel 44 and wheel strut 42 to cause the wheel struts 42 to pivot from the forward position towards the rear position, thereby compressing the spring 46; the greater the shock, the greater the wheel struts 42 will compress the springs 46.

Up to a predetermined limit, the springs 46 will resiliently oppose the movement of the wheel struts 42 and thus absorb the shocks on the wheels 44. These shocks are thus not transferred directly through the wheel assemblies 22a and 24 to the bag or case 20 and the contents thereof.

Figure 5:
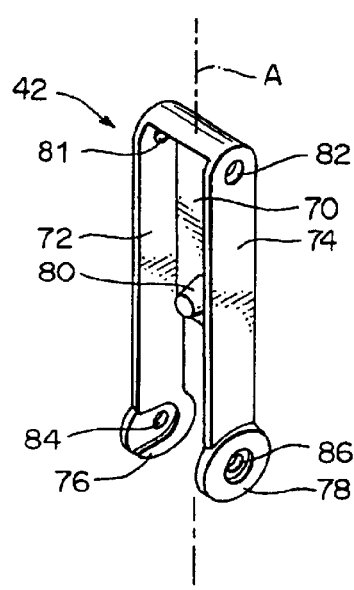
FIG. 5 is a perspective view of an exemplary strut member that may be employed by the wheel assembly of FIGS. 2 and 3.
Figure 4:
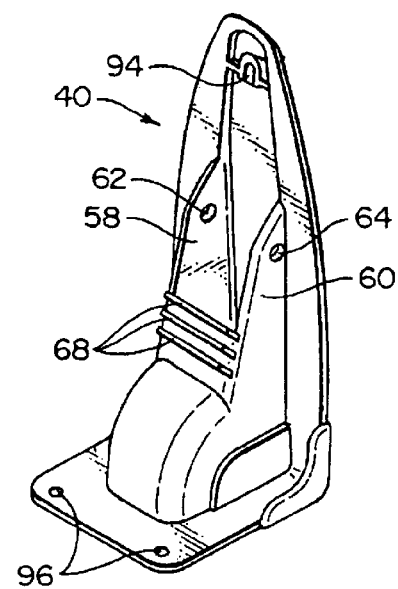
FIG. 4 is a perspective view of an exemplary wheel housing that may be employed by the wheel assembly of FIGS. 2 and 3.

Referring now to FIGS. 1, 4, and 5, depicted therein are certain construction details of the exemplary wheel housing 40 (FIG. 4) and exemplary wheel strut 42 (FIG. 5).

FIGS. 1–4 show that the exemplary wheel housing 40 comprises a kick plate portion 54, a wheel housing portion 56, and mounting flanges 58 and 60 extending between the kick plate portion 54 and the housing portion 56. Formed in the mounting flanges 58 and 60 are pivot openings 62 and 64. A spring socket 66 (FIGS. 2 and 3) is formed on the wheel housing portion 56. Bracing ribs 68 (FIGS. 2–4) are formed on the wheel housing portion 56 opposite the spring socket 66. The wheel housing 40 is preferably an injection molded plastic part, but other materials and manufacturing methods may be used. The details of the exemplary wheel housing 40 are not essential to implement the present invention.

The wheel strut 42 comprises a spring plate 70, first and second pivot flanges 72 and 74, and wheel bearing portions 76 and 78. A spring retainer projection 80 (FIGS. 2, 3, and 5) is formed on the spring plate 70. A pair of strut openings 81 and 82 are formed in the pivot portion 70. Wheel holes 84 and 86 are formed in each of the wheel bearing portions 74 and 76. Resilient bumpers 90 are mounted on the opposite side of the spring plate 70 from the retainer projection 80. The wheel strut 42 is also preferably an injection molded part but can be made of other materials and manufacturing methods. Again, the details of the exemplary wheel strut 42 are not essential to implement the present invention.

When assembled, the pivot pin 48 extends through the pivot openings 62 and 64 and the strut openings 81 and 82 to attach the wheel strut 42 to the wheel housing 40. The wheel axle 50 of the wheels 44 is passed through the wheel holes 84 and 86 to mount the wheels 44 onto the wheel strut 52. The spring 46 is arranged between the wheel housing portion 56 of the wheel housing 40 and the spring plate portion 70 of the strut member 42; the spring socket 66 and the spring retainer projection 80 engages the spring 46 to prevent the spring 46 from falling downward during normal use. So assembled, the spring 46 forces the wheel strut 42 towards the wheel housing 40.

The wheel assemblies 22a are then attached to the bag 20 by fasteners 92 (FIGS. 2 and 3) such as screws, rivets, snap fasteners, or the like. Sewing or an adhesive may be used instead of or in conjunction with the fasteners 92. The fasteners 92 extend through mounting holes 94 and 96 (FIG. 4) formed in the wheel housing 40 and into a structural portion 98 of the bag 20; preferably, the structural portion of the bag 20 is isolated from the delicate contents of the bag 20 to isolate the contents from any shocks that might be transmitted to the structural portion through the wheel assemblies 22a.

When no load is applied by the bag 20 onto the wheel assemblies 22a, the wheel struts 42 engage the wheel housings 40 through the bumpers 90; the bumpers 90 reduce wear on and absorb shocks between the struts 42 and the wheel housings 40. Bumpers may be added on both sides of the wheel struts 42 to absorb shocks when the struts 42 engage the housings 40 at either end of the arc through which the struts 42 rotate.

When the bag 20 applies a normal load onto the wheel assemblies 22a, the springs 46 compress slightly, allowing the wheel struts 42 to disengage from the wheel housings 40 such that the wheel struts are between the rotational limits shown in FIGS. 2 and 3. As the bag 20 is pulled, incidental shocks applied to the wheels 44 by uneven surfaces, bumps, and the like cause further compression of the springs 46 and thus rotation of the struts 42 relative to the housings 40. The springs 46 will absorb these shocks up to a limit determined by such factors as the strength of the springs 46 and the length of the struts 42. Above this predetermined limit, the springs 46 will be fully compressed as shown in FIG. 3 and additional shocks will be transmitted through the wheel housings 40 and to the bag 20.

Also, as shown in FIG. 3, the struts 42 will contact the housings 40 before the wheels 44 contact the housings 40. This allows the wheels 44 to rotate even if the load is above the predetermined limit.

II. Second Embodiment

Referring now to the FIGS. 6–10, depicted at 22b therein is yet another embodiment of a wheel assembly constructed in accordance with, and embodying, the principles of the present invention. Again, the wheel assembly 22b may be used as one or both of the wheel assemblies 22 and 24 attached to the bag 20.

The exemplary wheel assembly 22b comprises a wheel housing 140, a wheel strut 142, a wheel 144, and a spring 146. The wheel strut 142 is slideably mounted within the wheel housing 40 such that the strut 42 moves between lower (FIG. 6) and upper (FIG. 7) positions along a strut axis 148. A longitudinal axis of the strut 142 is aligned with the strut axis 148. During use, the longitudinal axis of the strut 142 is substantially vertical.

The wheel 144 is rotatably mounted to a lower end of the wheel strut 142 by a wheel axle 150 such that a portion of the wheel extends out of the housing 140. The spring 146 is mounted between the wheel strut 142 and the wheel housing 140 such that the spring 146 opposes movement of the wheel strut 142 from its lower position to its upper position. The spring 146 also functions to return the wheel strut 142 to its lower position from the upper position.

In use, the bag 20 is tipped slightly towards the direction of travel such that the entire weight of the bag is borne by the wheel assemblies 22b. With the exemplary wheel assembly 22b, the longitudinal axis of the strut 142 will tilt slightly from true vertical when the bag is tipped towards the direction of travel but will still be substantially vertically aligned.

The load of the bag 20 will thus act on the spring 146 through the wheels 144 and struts 142 and slightly compress the spring 146 during normal use. When the wheels 144 encounter an irregularity such as a bump, dip, or the like in the surface on which it is traveling, this irregularity will create a shock force that will cause the wheel struts 142 to slide from the lower position towards the upper position; the greater the shock, the greater the wheel struts 142 will compress the springs 146.

Up to a predetermined limit, however, the springs 146 will resiliently oppose the movement of the wheel struts 142 and thus absorb the shocks on the wheels 144. These shocks are thus not transferred through the wheel assemblies 22 and 24 to the bag 20 and the contents thereof. Beyond that predetermined limit, the spring 146 will be fully compressed and any additional shock will be transmitted to the bag 20.

Figure 10:
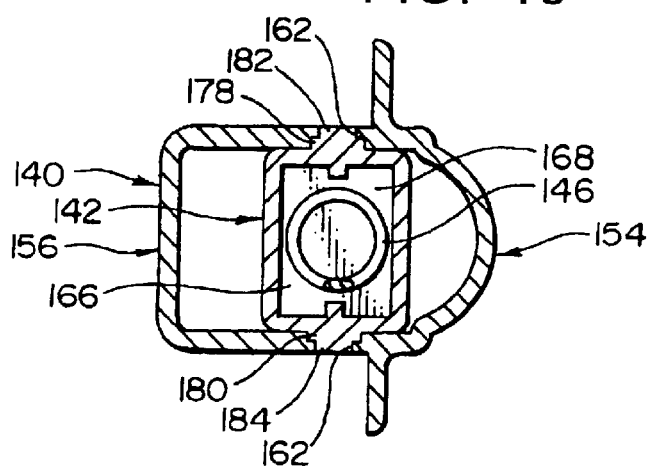
FIG. 10 is a top, cutaway view taken along lines 10—10 in FIG. 8.

The details of construction and assembly of the exemplary wheel housing 140 (FIG. 8) and exemplary wheel strut 142 (FIG. 9) will now be described. FIG. 10 illustrates the interoperation of the wheel housing 140 and wheel strut 142 when assembled.

Figure 8:
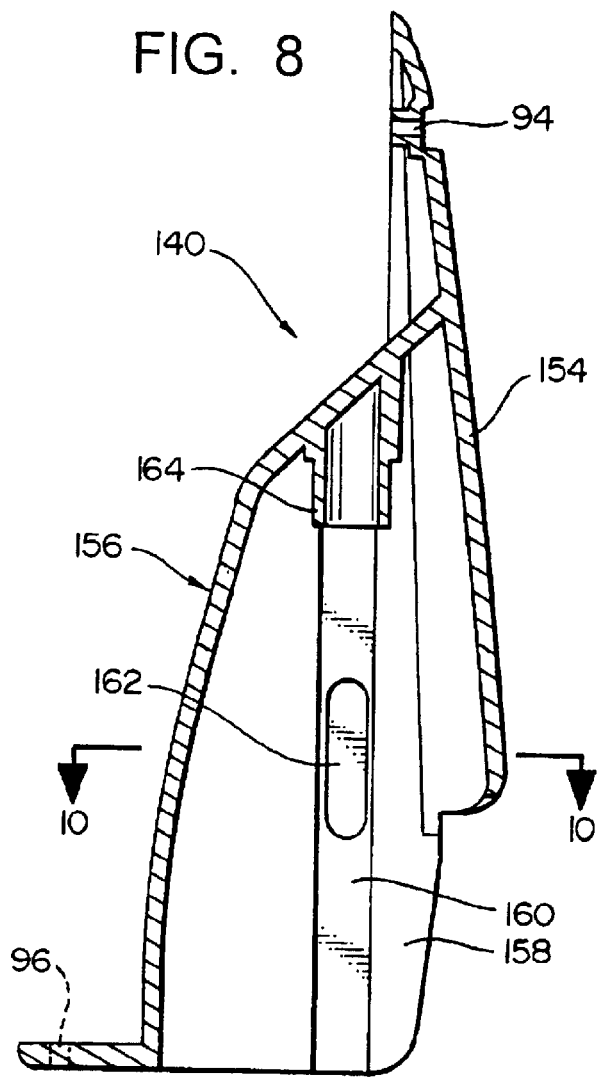
FIG. 8 is a side, cutaway view of an exemplary housing member that may be employed by the wheel assembly of FIGS. 6 and 7.
Figure 9:
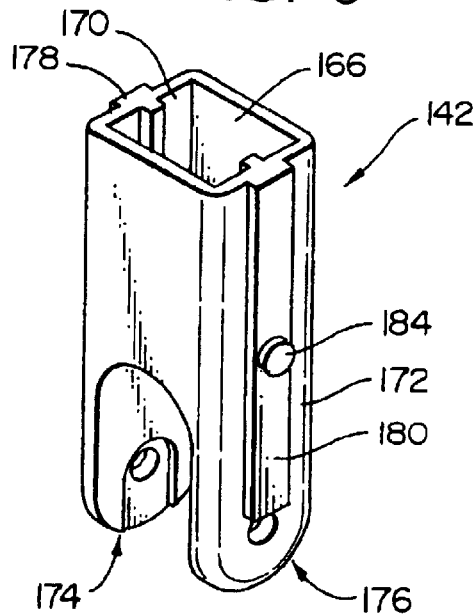
FIG. 9 is a perspective view of an exemplary strut member that may be employed by the wheel assembly of FIGS. 6 and 7.

As shown in FIG. 8, the exemplary wheel housing 140 comprises a kick plate 154, a wheel housing portion 156, and support walls 158 (only one shown in FIG. 8). A track 160 is formed on each of the support walls 158. A limit opening 162 is formed in each of the support walls 158. A spring retainer 164 extends downwardly from the wheel housing portion 156 in the direction of the tracks 160 to prevent horizontal movement of the spring 146 relative to the housing 140. The exemplary wheel housing 140 is preferably an injection-molded plastic part, but other materials and manufacturing techniques may be used as well. The exact details of the wheel housing 140 are not essential to implement the present invention.

Referring now to FIG. 13, it can be seen that the exemplary wheel strut 142 comprises a spring chamber 166 at least partly defined by a spring plate 168 and side walls 170 and 172. The exemplary spring chamber 166 is enclosed except for its upper end. The wheel strut 142 further comprises wheel bearing portions 174 and 176. Rails 178 and 180 are formed on the side walls 170 and 172. Limit projections 182 and 184 are formed on the side walls 170 and 172; in the exemplary wheel strut 142, these limit projections extend from the rails 178 and 180. The exemplary wheel strut 142 is preferably an injection-molded plastic part, but other materials and manufacturing techniques may be used as well. Again, the exact details of the wheel strut 140 are not essential to implement the present invention.

The rails 178 and 180 are sized, dimensioned, and located such that, when the wheel assembly 22b is assembled, the rails 178 and 180 engage the tracks 160 on the wheel housing to allow movement of the wheel strut 142 only in two directions along the strut axis 148. In addition, the limit projections 182 and 184 engage the limit openings 162 in the wheel housing 140 to limit movement of the wheel strut to a limited range of movement along the strut axis 148.

The spring 146 is arranged within the spring chamber 166 between the wheel housing portion 156 of the wheel housing 140 and the spring plate portion 168 within the strut member 142; the spring retainer 164 engages the spring 146 to ensure that the spring 146 is substantially aligned with the strut axis 148 during normal use. The exemplary spring retainer 164 is aligned with the spring chamber 166 and extends slightly therein when the spring 146 is fully compressed.

So assembled, the spring 146 forces the wheel strut 142 downward along the strut axis 148 relative to the wheel housing 140.

As with the wheel assemblies 22a, the wheel assemblies 22b are attached to the bag 20 by fasteners 92 (FIGS. 6 and 7); again, these fasteners 92 may be screws, rivets, snap fasteners, or the like. The fasteners 92 extend through mounting holes 94 and 96 (FIG. 4) formed in the wheel housing 40 and into the structural portion 98 of the bag 20; preferably, the structural portion of the bag 20 is isolated from the delicate contents of the bag 20 to isolate the contents from any shocks that might be transmitted to the structural portion through the wheel assemblies 22a.

Figure 6:
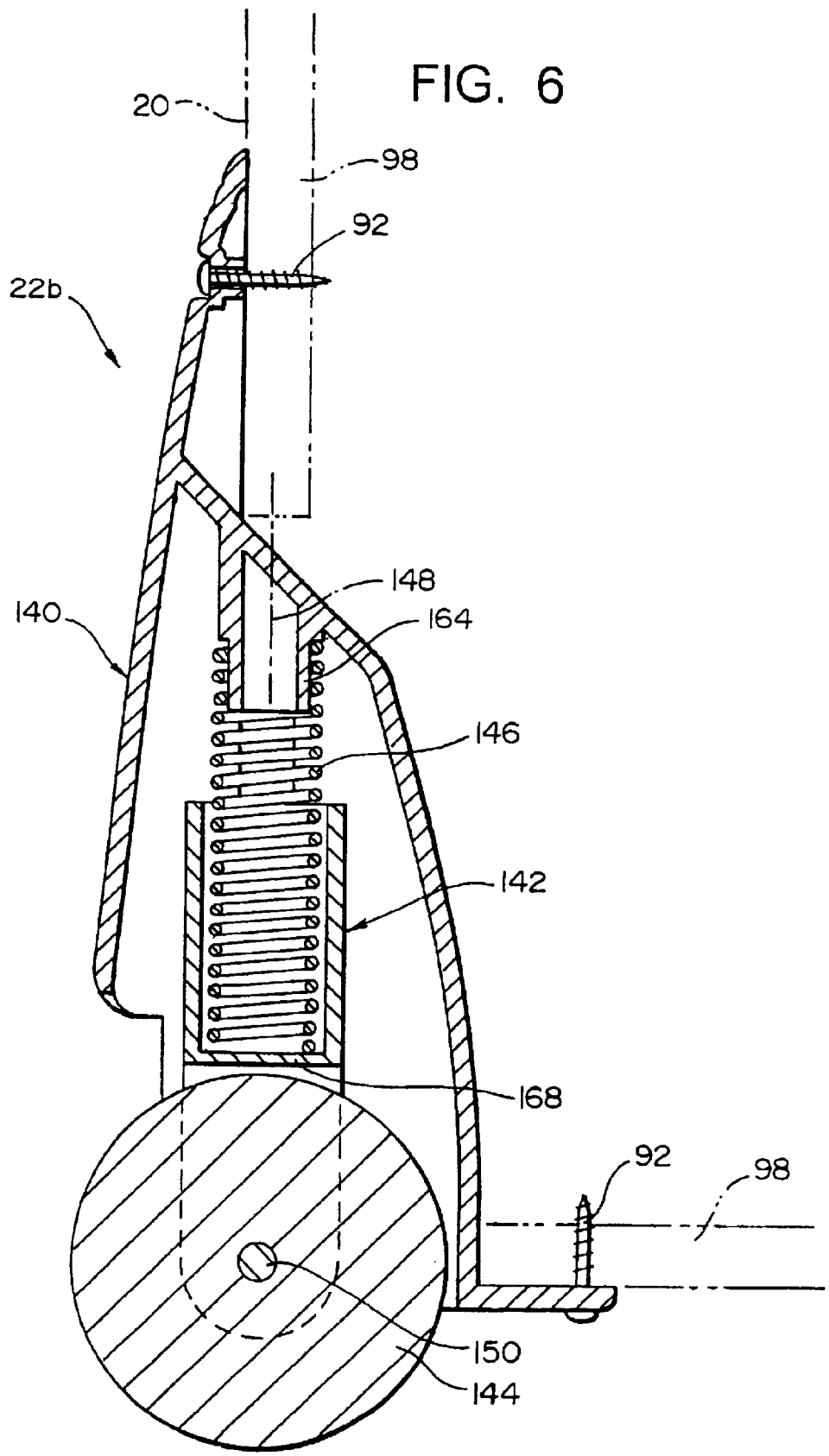
FIGS. 6 and 7 are side, cutaway views depicting a second embodiment of a wheel assembly that may be used by the computer bag or case of FIG. 1.
Figure 7:
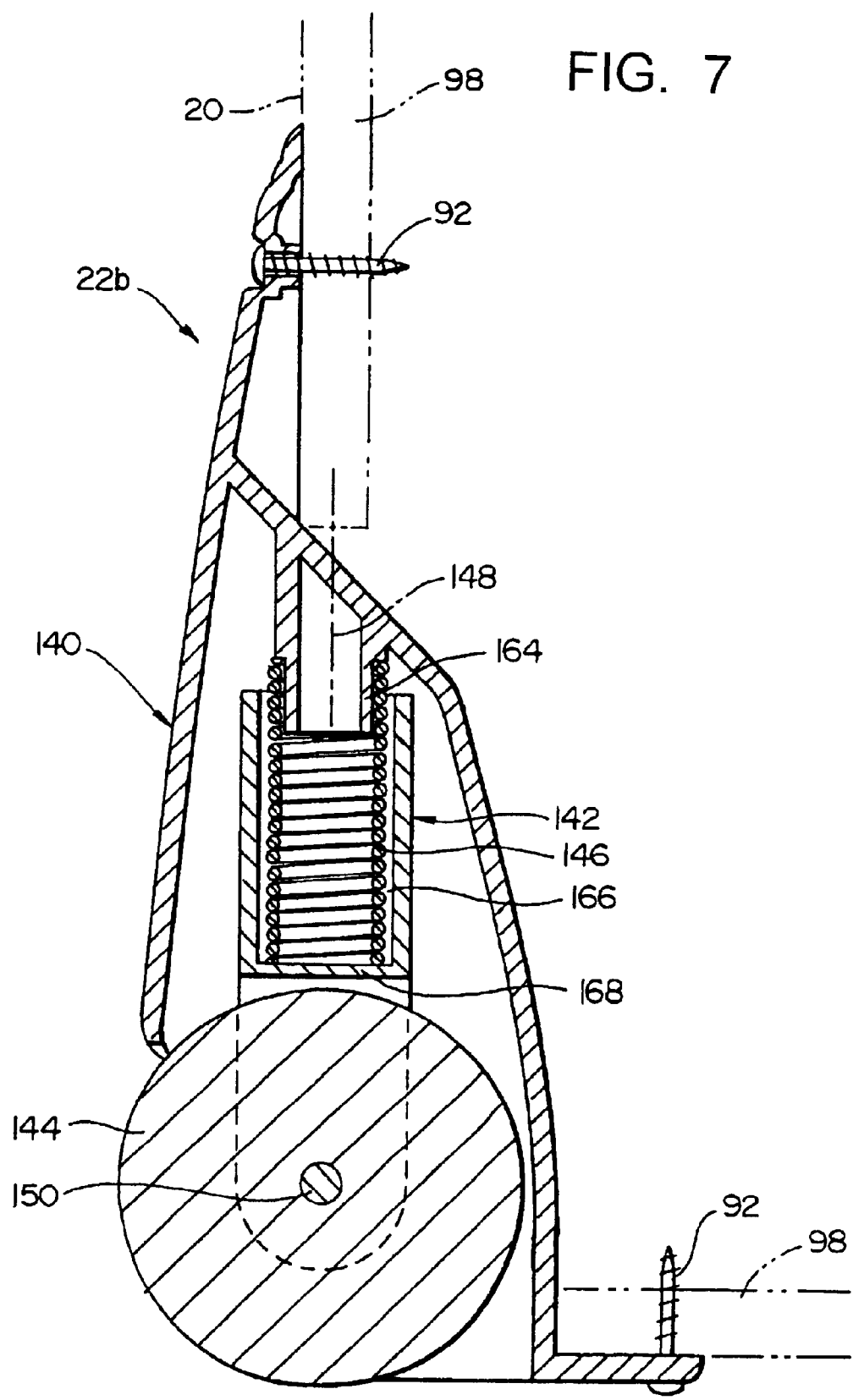

When the bag 20 applies a normal load onto the wheel assemblies 22b, the springs 146 compress slightly, allowing the wheel struts 142 to move up slightly along the strut axis 148 towards the spring retainer 164 such that the wheel struts 142 are between the lower and upper limits shown in FIGS. 6 and 7 and defined by the limit projections 182 and 184 and the limit openings 162.

As the bag 20 is pulled, incidental shocks applied to the wheels 144 by uneven surfaces, bumps, and the like cause further compression of the springs 146 and thus movement of the struts 142 upward along the strut axis 148 relative to the wheel housings 140. The springs 146 will absorb these shocks up to a limit determined by such factors as the strength of the springs 46 and the range of movement allowed by the limit projections 182 and 184 and the limit openings 162.

Above this predetermined limit, the springs 146 will be fully compressed as shown in FIG. 7 and additional shocks will be transmitted through the wheel housings 140 and to the bag 20.

The strut axis 148 defined by the exemplary wheel assembly 22b is substantially parallel to a back wall of the bag 20, so the longitudinal axis of the strut 142 will not be completely vertical when the bag is tilted and pulled. The wheel assembly 22b may be modified such that the strut axis 148 is offset from the back wall of the bag by several degrees; in this case, the strut axis 148 will be out of vertical (but still substantially vertical as defined herein) when the bag is at rest and close to true vertical when the bag 20 is being pulled. This slight misalignment of the strut axis 148 with respect to the vertical panels of the bag 20 reduces friction between the strut 142 and housing 140; this reduction in friction in turn allows the spring 146 to absorb most of the shocks on the wheels 144 and not allow these shocks to be passed to the bag via frictional engagement of the wheel strut 142 and the wheel housing 140.

Whether the strut axis 148 is aligned with the bag panels or misaligned as just described, the strut axis 148 will be substantially vertically aligned under all conditions of normal use with the bag 20 upright or tipped slightly forward during pulling. With the embodiment 22b described above, the angle between the strut axis 148 and true vertical when the bag 20 is tilted and pulled is approximately 20°.

If the embodiment 22b is modified such that the strut axis 148 is not parallel with the vertical panels of the bag 20, the angle between the strut axis 148 and the bag vertical panels is preferably approximately 20°. This angle is thus preferably within a first range of approximately 10° to 30°, but in any event should be within a second preferred range of approximately 5° to 45°.

In either variation, the strut axis 148 is substantially vertical as described herein during normal use, which reduces the likelihood that dirt, rocks, and debris will collect between the strut 142 and housing 140 and interfere with movement of the strut 142.

What is claimed is:

1. A wheel assembly for supporting a bag that is tilted and pulled along a surface with a bottom edge of the bag adjacent to the surface, the wheel assembly comprising:
   a wheel housing adapted to be rigidly attached to the bottom edge of the bag;
   a strut member arranged within the housing for movement between first and second positions, where the strut member defines a longitudinal axis and comprises
      first and second elongate pivot flanges,
      a spring plate that spaces the first and second pivot flanges from each other such that the pivot flanges are spaced from and parallel to the longitudinal axis of the strut member,
      first and second strut openings formed in the first and second pivot flanges, respectively, and
      first and second wheel openings formed in the first and second pivot flanges, respectively;
   a pivot pin that extends through the first and second strut openings of the strut member to the wheel housing, where
      the strut member rotates between the first and second positions about an axis defined by the pivot pin, and
      the longitudinal axis of the strut member extends substantially through the pivot pin;
   a spring member arranged to engage the wheel housing and the spring plate of the strut member to resiliently oppose rotation of the strut member from the first position to the second position;
   a wheel member; and
   a wheel axle extending through the first and second wheel openings and the wheel member to rotatably attach the wheel member to the strut member, where
      at least a portion of the wheel member extends out of the wheel housing as the strut member moves between the first and second positions, and
      the longitudinal axis of the strut member extends substantially through the wheel axle; wherein
   the wheel member engages the surface and rotates to allow the bag to roll along the surface when the bag is tilted and pulled;
   the longitudinal axis of the strut member is substantially vertical when the strut member is in the first position while the bag is tilted and pulled with only the wheel member in contact with the surface;
   irregularities in the surface cause the wheel member to move between the first and second positions relative to the bag such that the spring plate acts on and resiliently deforms the spring member to inhibit transfer of shocks associated with such irregularities from the wheel member to the wheel housing;
   the spring member is located above, relative to true vertical, the wheel axle when the strut member moves between the first and second positions while the bag is tilted and pulled with only the wheel member in contact with the surface;
   the pivot pin is located above, relative to true vertical, the wheel axle when the strut member moves between the first and second positions while the bag is tilted and pulled with only the wheel member in contact with the surface; and
   the pivot flanges and spring plate are substantially angled with respect to horizontal when the strut member moves between the first and second positions while the bag is tilted and pulled with only the wheel member in contact with the surface to inhibit the collection of debris between the strut member and the wheel housing.

2. A wheel assembly as recited in claim 1, in which a spring retaining portion of at least one of the spring plate of the strut member and the wheel housing maintains the spring member in a desired orientation relative to the strut member and the wheel housing.

3. A wheel assembly as recited in claim 2, in which the spring retaining portion extends from the spring plate of the strut member and into the spring member.

4. A wheel assembly as recited in claim 2, in which the spring retaining portion is a socket formed on the wheel housing that receives an end of the spring member.

5. A wheel assembly as recited in claim 1, further comprising:
   a retainer projection that extends from the strut member and into the spring member; and
   a socket formed on the wheel housing that receives an end of the spring member; wherein
   the retainer projection and the socket engage the spring member to maintain the spring member in a desired orientation relative to the strut member and the wheel housing.

6. A wheel assembly as recited in claim 1, further comprising bumper members mounted on at least one of the strut member and the housing member to absorb shocks when the strut member is in the second position.

7. A method of supporting a bag as the bag is tilted and pulled along a surface, the method comprising the steps of:
   rigidly connecting a wheel housing to a bottom edge of the bag;
   providing a strut member defining a longitudinal axis and comprising
      first and second elongate pivot flanges,
      a spring plate that spaces the first and second pivot flanges from each other such that the pivot flanges are spaced from and parallel to the longitudinal axis of the strut member,
      first and second strut openings formed in the first and second pivot flanges, respectively, and
      first and second wheel openings formed in the first and second pivot flanges, respectively;
   extending a pivot pin through the first and second strut openings in the strut member to connect the strut member to the housing for rotation between first and second positions about a pivot axis such that the longitudinal axis defined by the strut member extends substantially through the pivot axis;

opposing movement of the strut member from the first position to the second position by arranging a spring member between the wheel housing and a spring plate of the strut member;

extending a wheel axle through the first and second wheel openings and a wheel member such that
  at least a portion of the wheel member extends out of the wheel housing as the strut member moves between the first and second positions, and
  the longitudinal axis of the strut member extends substantially through the wheel axle;

tilting the bag such that the wheel member engages the surface and the load of the bag is transmitted at least partly from the wheel housing to the strut member through the spring member; and arranging the spring member such that the spring member is below, relative to true vertical, the pivot portion when the bag is tilted and pulled with only the wheel member in contact with the surface such that the longitudinal axis of the strut member is substantially vertically aligned when the strut member is in the first position while the bag is tilted and pulled with only the wheel member in contact with the surface;

irregularities in the surface cause the wheel member to move between the first and second positions relative to the bag such that the spring plate acts on and resiliently deforms the spring member to inhibit transfer of shocks associated with such irregularities from the wheel member to the wheel housing;

arranging the spring member above, relative to true vertical, the wheel axle when the strut member moves between the first and second positions while the bag is tilted and pulled with only the wheel member in contact with the surface;

arranging the pivot pin above, relative to true vertical, the wheel axle when the strut member moves between the first and second positions while the bag is tilted and pulled with only the wheel member in contact with the surface; and angling the pivot flanges and spring plate with respect to horizontal when the strut member moves between the first and second positions while the bag is tilted and pulled with only the wheel member in contact with the surface to inhibit the collection of debris between the strut member and the wheel housing.

\* \* \* \* \*